(12) United States Patent
Joliveau et al.

(10) Patent No.: US 10,735,489 B1
(45) Date of Patent: Aug. 4, 2020

(54) MID-STREAM CONTENT DELIVERY NETWORK SWITCHING

(71) Applicant: Amazon Technologies, Inc., Seattle, WA (US)

(72) Inventors: Marc Joliveau, Seattle, WA (US); Gregory Scott Benjamin, Seattle, WA (US); Nicholas James Benson, Seattle, WA (US); Justin Michael Binns, Auburn, WA (US); Kenneth Thomas Burford, Seattle, WA (US); Stefan Christian Richter, Seattle, WA (US); Li Tong, Seattle, WA (US); Charles Benjamin Franklin Waggoner, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 437 days.

(21) Appl. No.: 15/076,344

(22) Filed: Mar. 21, 2016

(51) Int. Cl.
*H04L 29/06* (2006.01)

(52) U.S. Cl.
CPC .......... *H04L 65/80* (2013.01); *H04L 65/4084* (2013.01); *H04L 65/601* (2013.01)

(58) Field of Classification Search
CPC ........... H04N 21/4622; H04N 21/2187; H04N 21/23103; H04N 21/23106; H04N 21/23406; H04N 21/237; H04N 21/238; H04N 21/2387; H04N 21/2402; H04N 21/26216; H04N 21/26258; H04N 21/278; H04N 21/41407; H04N 21/6106; H04N 21/6125; H04N 21/6131; H04N 21/64738; H04N 21/8456; H04L 65/4084; H04L 65/601; H04L 65/608; H04L 65/80; H04L 67/02; H04L 67/42
See application file for complete search history.

(56) References Cited

U.S. PATENT DOCUMENTS

| | | | | |
|---|---|---|---|---|
| 9,118,680 | B1 * | 8/2015 | Dunlap | H04L 67/1008 |
| 2009/0025046 | A1 * | 1/2009 | Ganesan | G06F 17/30017 |
| | | | | 725/91 |
| 2011/0225302 | A1 * | 9/2011 | Park | H04L 65/4084 |
| | | | | 709/227 |
| 2012/0272281 | A1 * | 10/2012 | Ha | H04N 21/23439 |
| | | | | 725/110 |
| 2012/0297081 | A1 * | 11/2012 | Karlsson | H04L 65/4084 |
| | | | | 709/231 |
| 2014/0006951 | A1 * | 1/2014 | Hunter | H04H 60/31 |
| | | | | 715/719 |
| 2014/0250230 | A1 * | 9/2014 | Brueck | H04L 65/607 |
| | | | | 709/226 |
| 2016/0234069 | A1 * | 8/2016 | Coudurier | H04N 21/64753 |
| 2016/0337426 | A1 * | 11/2016 | Shribman | H04L 65/4084 |
| 2017/0188072 | A1 * | 6/2017 | Major | H04N 21/2402 |

* cited by examiner

*Primary Examiner* — Dhairya A Patel
*Assistant Examiner* — Sandarva Khanal
(74) *Attorney, Agent, or Firm* — Weaver Austin Villeneuve & Sampson LLP

(57) ABSTRACT

Techniques are described for switching streaming of media content between content delivery networks (CDNs) during mid-stream. An initial CDN can be used to stream the media content. The performance of a second CDN can be measured by requesting a fragment of the media content as a measurement or test fragment. Streaming of the media content can be switched to the second CDN if its performance is determined to be better than the initial CDN.

25 Claims, 12 Drawing Sheets

MID-STREAM CONTENT DELIVERY NETWORK SWITCHING

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Media content is often streamed over networks using adaptive bitrate streaming for playback on a viewer's device. Adaptive bitrate streaming includes determining the viewer device's bandwidth and hardware resources (e.g., available central processing unit (CPU) capacity) in real time and adjusting the quality of the media content that is requested from a media server and played back on the viewer's device to account for changes in the bandwidth and hardware resources. Fragments at different quality levels of the media content detailed in a manifest file are requested individually and stored in a buffer for playback. The manifest file can indicate that the fragments should be streamed from a specific content delivery network (CDN). Unfortunately, the performance of CDNs can vary, resulting in an unreliable and/or lower quality playback of the media content if a lower performing CDN is selected to provide the requested fragments rather than a higher performing CDN.

DETAILED DESCRIPTION

This disclosure describes techniques for mid-stream content delivery network (CDN) switching that can allow for improved playback of media content (e.g., movies, television shows, videos, music, electronic books, etc.) on viewer devices. For example, a video streaming service providing video-on-demand (VOD) and/or livestreaming might employ several different CDNs to provide fragments of the media content for playback on viewer devices. A viewer device can contact a media server of the streaming service to receive manifest data indicating playback options detailing fragments of the media content available at different quality levels at the different CDNs. The viewer device can begin streaming (e.g., using the manifest data to request and receive fragments of the media content) from a first CDN prioritized by the media server and begin filling a playback buffer with fragments that are used to provide playback of the media content. The first CDN might be prioritized because the media server might analyze performance data from the different CDNs and shift traffic among the CDNs so that the viewer device is provided a more reliable and higher quality playback experience if it requests fragments from that CDN.

However, during streaming, performances of CDNs might change, and therefore, another CDN might result in being capable of providing a more reliable and higher quality playback experience. The viewer device can contact a second CDN and request a fragment for playback and also as a measurement of the performance of the second CDN. This measurement, or test, fragment might be requested when the playback buffer has been filled with a certain threshold number of fragments or threshold time period of playback is available based on the fragments from the first CDN. The viewer device can then switch to the second CDN if its performance is determined to be better than the first CDN.

Figure 1:
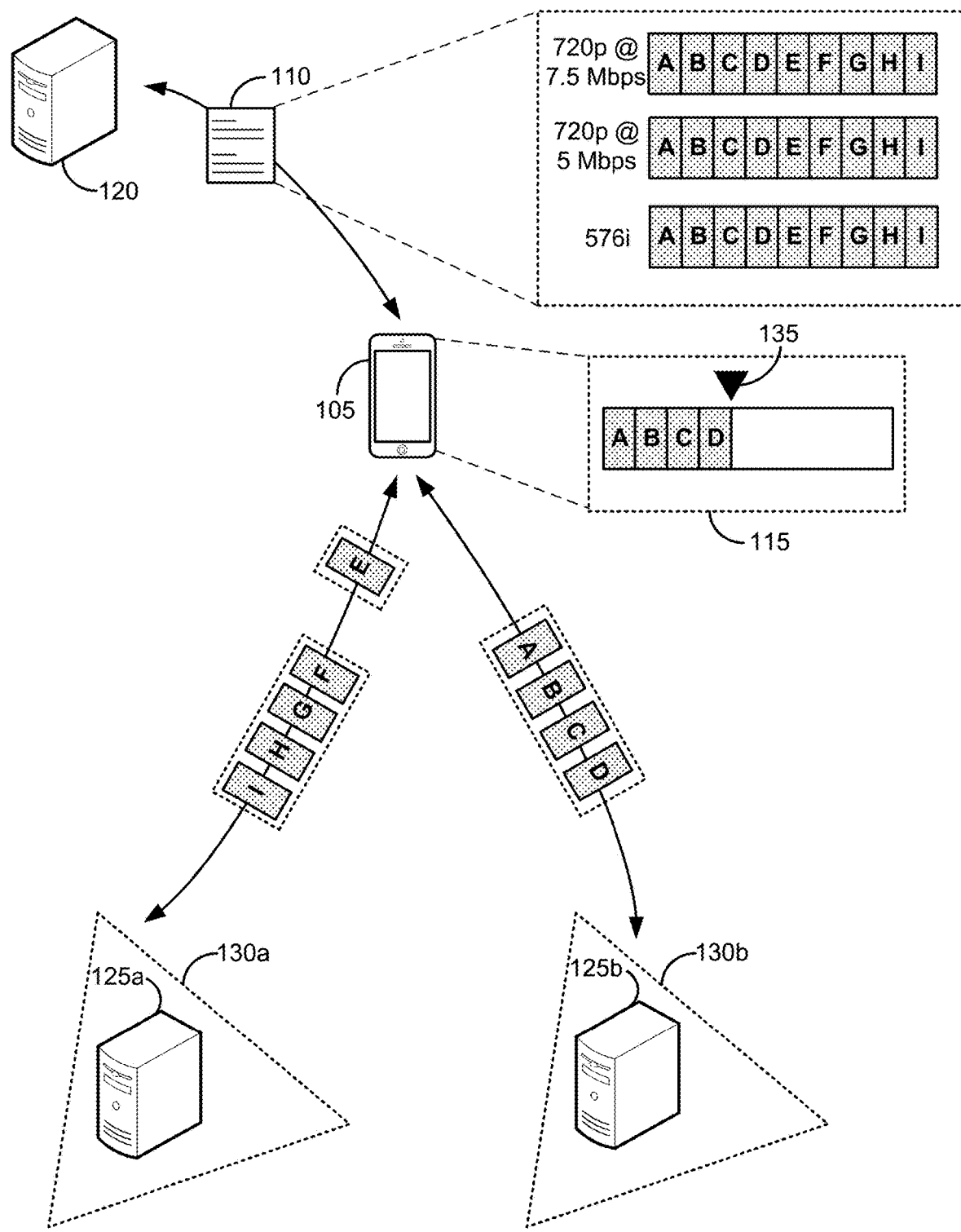
FIG. 1 illustrates an example of mid-stream switching between content delivery networks (CDNs) for media content playback.

In more detail, FIG. 1 illustrates an example of mid-stream switching between content delivery networks (CDNs) for media content playback. As shown in FIG. 1 viewer device 105 can be an electronic device, such as a smartphone, that can be used to stream media content for playback on a display using fragments A-I stored in its playback buffer 115. The fragments stored in playback buffer 115 are received from edge servers 125a or 125b of CDNs 130a or 130b, respectively, based on a manifest file 110 received from media server 120.

As an example, viewer device 105 can request and receive manifest data such as manifest file 110 (which can be one or more markup files or other types of data structures, data provided over an API, etc.) providing playback options for requested media content. In the depicted implementation, manifest file 110 can indicate a content delivery network (one of CDNs 130a or 130b) that should be used by viewer device 105 to initially request some of fragments A-I of the media content for playback (or an order in terms of priority of CDNs to be used to request the fragments).

For example, viewer device 105 might request playback of media content (e.g., episode #1 of the television show Transparent) by providing a request to media server 120 for a manifest file indicating fragments, or segments, of the playback of the media content available at different quality levels based on bitrates and/or resolutions. The manifest file includes metadata that allows the viewer device to generate properly formatted requests for specific fragments of the media content from a CDN. A sequence of fragments together enables playback of the full media content.

In FIG. 1, manifest file 110 indicates available playback options for the video quality level of fragments A-I of the media content. The video quality levels are indicated as 720p at 7.5 megabits per second (Mbps), 720p at 5 Mbps (e.g., providing a lower frame rate than the 720p at 7.5 Mbps playback option), and 576i. During the streaming of the media content (e.g., when fragments A-I are requested and received by viewer device 105 for playback), fragments A-I can be requested at any of the video quality levels. For example, as the available bandwidth of viewer device 105 degrades, it might downgrade the video quality level of fragments it requests, for example, by switching from requesting the fragments at the 720p at 5 Mbps level to the 576i level. This can result in a situation in which requested fragments A-E might be at a higher quality level than requested fragments F-I. Audio portions of the media content can also be provided in fragments. Additional information, such as available subtitles, can also be provided or detailed in the manifest file.

The fragments can be requested from a CDN specified in manifest file 110. For example, a universal resource locator (URL) can be indicated in manifest file 110 or viewer device 105 can generate a URL using the data in manifest file 110 to contact the CDN to provide the fragments. As a result, even though both CDNs 130a and 130b in FIG. 1 can provide fragments of the media content for playback, viewer device 105 might request the fragments from edge server 125b of CDN 130b if it is indicated as the CDN to contact in manifest file 110.

In FIG. 1, fragments A-D are requested from edge server 125b of CDN 130b and stored in playback buffer 115 of viewer device 105 for playback. Playback buffer 115 can store a relatively small amount of data for playback of media content (e.g., seconds to minutes). As fragments are played back, they can be removed from playback buffer 115 and new fragments can be requested and stored for playback. Thus, the streaming process involves requesting new fragments to store as the playback of the media content advances.

If the bandwidth of the communication connection (e.g., Internet connection) between viewer device 105 and edge server 125 significantly degrades or the performance of CDN 130b degrades, the streaming of the media content using the fragments can begin to drain playback buffer 115 faster than it can be filled, resulting in the playback being interrupted for rebuffering. For example, if the communication connection degrades, for example, by having its bandwidth reduce, lower quality fragments can be requested to try to fill playback buffer 115 faster than it is being drained. However, if the bandwidth continues to degrade and if playback buffer 115 empties or is about to empty, then viewer device 105 might need to rebuffer by re-filling playback buffer 115 with fragments while halting playback of media content, which results in the viewer's experience being interrupted. As a result, having viewer device 105 switch to streaming to a higher performing CDN can avoid rebuffering and generally increase the quality of the playback experience of the media content.

As previously discussed, viewer device 105 might stream from edge server 125b of CDN 130b based on manifest file 110. That is, viewer device 105 can be provided which CDN to stream from around the time it receives manifest file 110. Other CDNs might be indicated as backup options. This initial CDN might, in the beginning, provide the best performance. However, during the middle of the playback, or during mid-stream or middle of the streaming, the performances of CDNs 130a and 130b might change. For example, CDN 130a might later be a better performing CDN for viewer device 105 to request fragments from than CDN 130b.

In the implementation of FIG. 1, viewer device 105 can request one or more fragments from a second CDN to be placed in playback buffer 115 that can also be used as a measurement of the performance of that second CDN. For example, in FIG. 1, as playback buffer 115 is filled with fragments A-D received from CDN 130b, it can be filled to a threshold level indicated as playback buffer threshold level 135. Playback buffer threshold level 135 can indicate a certain playback period of the media content that is represented by fragments A-D. For example, playback buffer threshold level 135 can indicate the point when the fragments stored in it provide 30 seconds of playback. In other implementations, playback buffer threshold level 135 might be based on the number of fragments stored in playback buffer 115 (e.g., four fragments as depicted in FIG. 4), the file sizes of the fragments stored in playback buffer 115 (e.g., 50% of the capacity of playback buffer 115 has been filled), etc.

When the number of fragments in playback buffer 115 reaches playback buffer threshold level 135, a fragment from another CDN can be requested as a test or measurement of the performance of that other CDN. Playback buffer 115 reaching playback buffer threshold level 135 can be the result of the playback time in playback buffer 115 decreasing due to deterioration of the stream from CDN 130b. In other situations, it can indicate that enough fragments are being stored to increase the playback time in playback buffer 115 due to CDN 130b offering good performance, and therefore, it has offered enough safety margin to provide a measurement of one or more other CDNs while avoiding a potential rebuffering event. In FIG. 1, this results in viewer device 105 requesting fragment E from edge server 125a of CDN 130a rather than edge server 125b of CDN 130b. The requesting of fragment E can be used to measure the performance of CDN 130b.

For example, when requesting fragments from edge servers of CDNs, viewer device 105 might use a time out period to indicate that a request for a fragment has failed. The time out period can indicate a time period in which the request for the fragment has been transmitted from the viewer device and lasts in duration until the fragment should be received. If a CDN does not provide the fragment within the time out period, then the request for the fragment may be considered to have failed, and therefore, viewer device 105 might generate another request for the same fragment to the same edge server of the CDN.

The time out period used for requesting one of fragments A-D from edge server 125b of CDN 130b can be used to measure the performance of edge server 125a of CDN 130a when requesting fragment E. For example, if viewer device 105 requests fragment E and edge server 125a does not provide it within the time out period, then it can be determined that edge server 125b of CDN 130b is performing better than edge server 125a of CDN 130a because edge server 125a was not able to provide the fragment within the time out period. In some implementations, the time out period used for CDN 130b can be different than the timeout period used for CDN 130a. That is, the time out period for requesting one of fragments A-D can be different than the time out period for requesting fragment E as a measurement fragment. For example, the time out period for the CDN whose performance in providing fragments is being measured (e.g., CDN 130a) can have a shorter time out period than the CDN currently being used to stream (e.g., CDN 130b). This can allow for a switch from CDN 130b to CDN 130a only if CDN 130a has a better performance. If the performance of CDN 130a is worse, the same as, or even only slightly better, then the mid-stream switching of the playback of the media content can be prevented by having a shorter duration time out period for the CDN that is being measured by requesting fragment E as a measurement fragment.

In FIG. 1, if fragment E is received before the end of the time out period for CDN 130a, then it can be stored in playback buffer 115. Additionally, if the data rate at which fragment E was received is better than the data rate at which fragments A-D were received, then CDN 130a can be determined to be a better performing CDN for viewer device 105 to stream from, and therefore, viewer device 105 can switch from requesting fragments from CDN 130b to CDN 130a, for example, by requesting fragments F-I from edge server 125a of CDN 130a rather than edge server 125b of CDN 130b.

In some implementations, media server 120 can indicate that viewer device 105 should switch the CDN mid-stream, and/or provide additional data that can be useful for viewer device 105 to use when determining whether to switch the CDN mid-stream. For example, media server 120 can provide data to viewer device 105 regarding other viewer devices within the geographical vicinity, such as from which CDN they are streaming. If they are streaming from another CDN, then it may be useful to either request a fragment from that CDN as a measurement fragment or switch to that CDN since it might also provide better performance.

Allowing for mid-stream CDN switching for VOD or livestream media content can provide a more reliable and higher quality experience during the entire playback of the media content.

Figure 2:
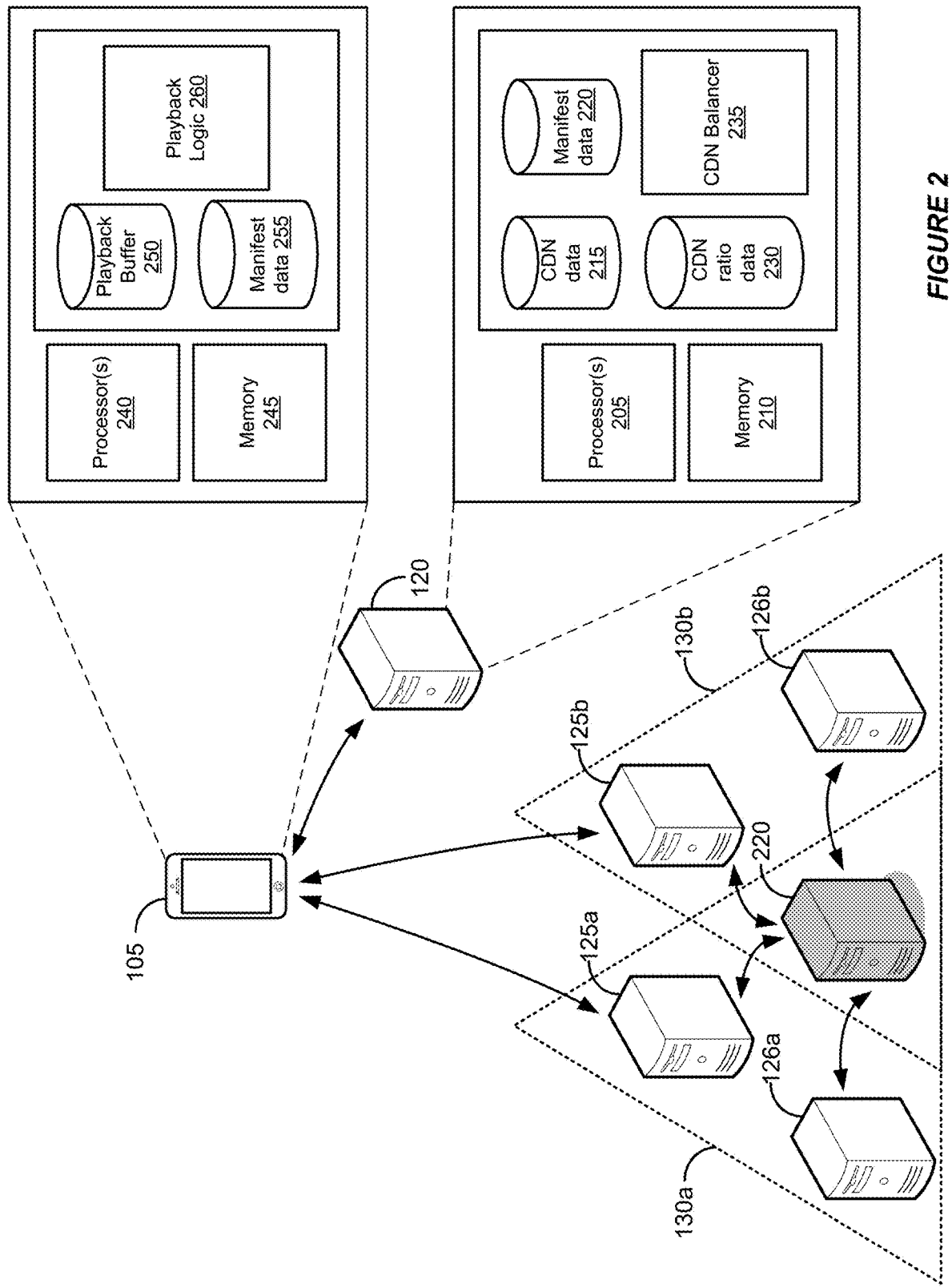
FIG. 2 illustrates an example of a computing environment in which mid-stream switching between CDNs can be used for media content playback.

FIG. 2 illustrates an example of a computing environment in which mid-stream switching between CDNs can be used for media content playback. The computing environment of FIG. 2 includes media server 120 which can be used to provide manifest data to viewer device 105 so that it can request and receive fragments of media content from edge servers 125a or 125b of CDNs 130a or 130b, respectively. Viewer devices can include smartphones, televisions, laptop computers, desktop computers, set-top boxes, video game consoles, tablets, wearable devices, virtual reality headsets, and other electronic devices.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 and CDNs 130a and 130b may be part of a content delivery system that conforms to any of a wide variety of architectures. The functionality and components of media server 110 and CDNs 130a and 130b can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on a viewer device), integrated into a separate app from another entity, implemented in an edge server or content server of a CDN, a server of an ISP, etc.

In FIG. 2, viewer device 105 includes various types of logic used to implement a video player to provide playback of media content. Viewer device 105 can include one or more processors 240, memory 245, a display, and other hardware components to provide playback logic 260 to request dynamic manifest files (and stored in manifest data 255) and fragments of media content (stored in playback buffer 250). For example, processors 240 can execute stored instructions in memory 245 to implement the techniques disclosed herein.

Media server 120 includes one or more processors 205, memory 210, and other hardware components to provide manifest file 110 to viewer device 105 so that it can request fragments from CDNs 130a or 130b. Processors 205 and memory 210 can implement CDN balancer 235, which can use CDN data 215 storing performance characteristics data regarding CDNs 130a and 130b and generate manifest file 110 to be provided to viewer device 105 based on manifest data 220. CDN ratio data 230 can be used to indicate in manifest file 110 which of CDNs 130a or 130b should first be used by viewer device 105. In some implementations, data of manifest file 110 is provided in more than one file, or provided in other ways as previously discussed. Processors 205 can execute stored instructions in memory 210 to implement the techniques disclosed herein.

Edge servers 125a, 125b, 126a, and 126b can be unique to the respective CDNs, but each CDN 130a and 130b might include the same origin server 220. Edge servers 125a, 125b, 126a, and 126b can provide caching of recently requested fragments of media content and contact origin server 220 to request fragments that are not in their respective caches if those fragments are requested by a viewer device. Any number of "middle tiers" of servers between origin server 220 and edge servers 125a, 125b, 126a, and 126b can also provide intermediate levels of caching and other functionality to provide media content playback at viewer device 105. In some implementations, origin server 220 and media server 120 can be implemented together.

Figure 3A:
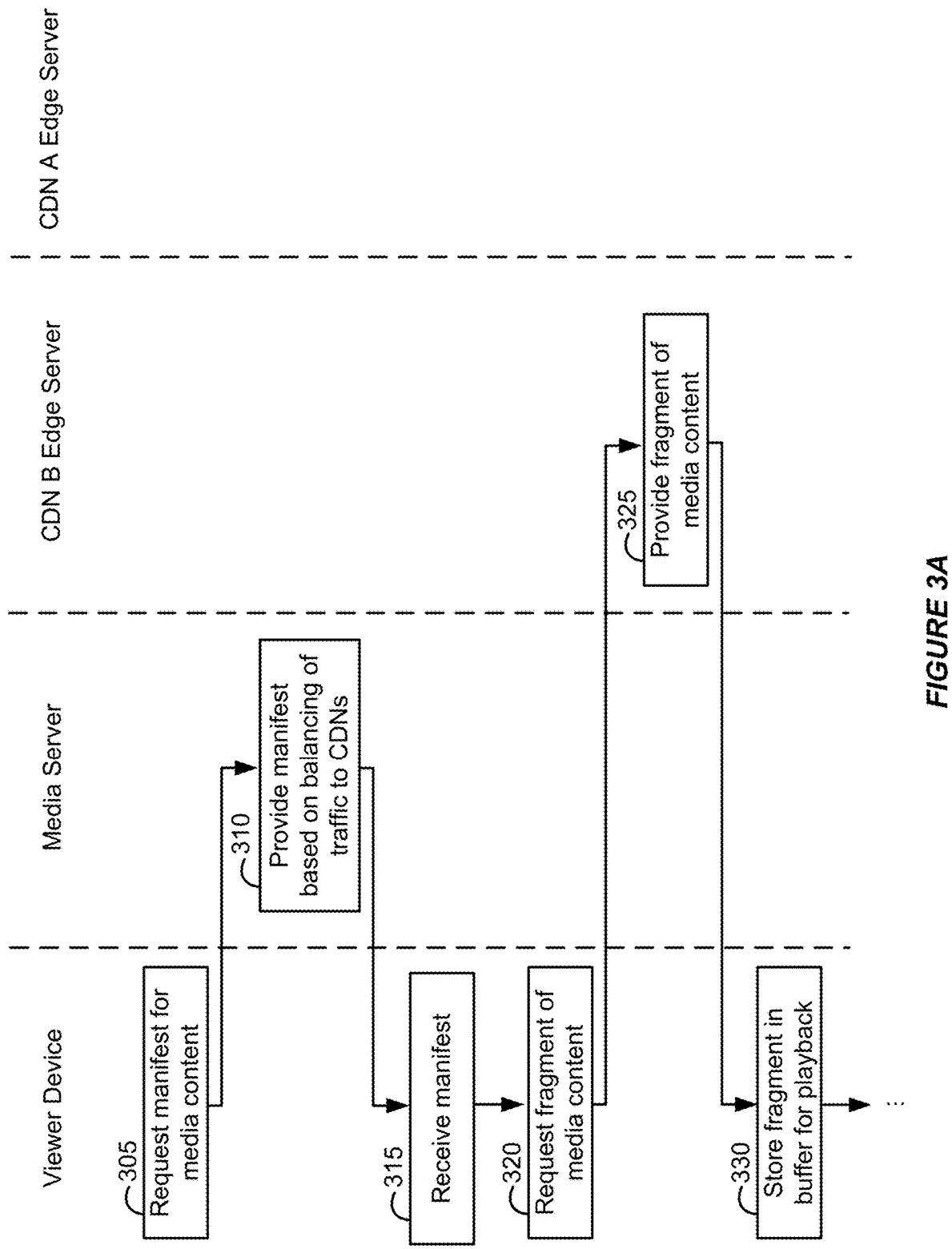
FIGS. 3A-E is a flowchart illustrating mid-stream CDN switching for media content playback.

A specific implementation will now be described with reference to FIG. 1, the computing environment of FIG. 2, and the flow diagrams of FIGS. 3A-E. In FIG. 3A, a viewer device (e.g., viewer device 105) can request media content, for example, by selecting an episode of a television show for playback from a video streaming service in a web browser or software program, and therefore, request manifest data indicating playback options for the media content 125 (305). The request can be provided to and received by media server 110 and it can provide manifest data in the form of one or more manifest files (310). As previously discussed, the manifest file can indicate a CDN for viewer device to contact to request fragments of the media content as detailed in the manifest file. The CDN can be selected based on traffic balancing ratios of the CDNs used by the video streaming service, for example, to gradually shift traffic among the CDNs based on their performances.

Viewer device 105 receives the manifest file (315) and can generate a request for a fragment of the media content using the data in the manifest file (320). As previously discussed, manifest file 110 can indicate fragments of media content at different video and audio quality levels available for playback. The request can be provided to a first CDN (e.g., CDN 130b) and it can provide the requested fragment to the viewer device (325). The viewer device can then store the fragment in a buffer (e.g., in memory) for playback (330). For example, the fragment can be stored in playback buffer 115 in FIG. 1.

Figure 3B:
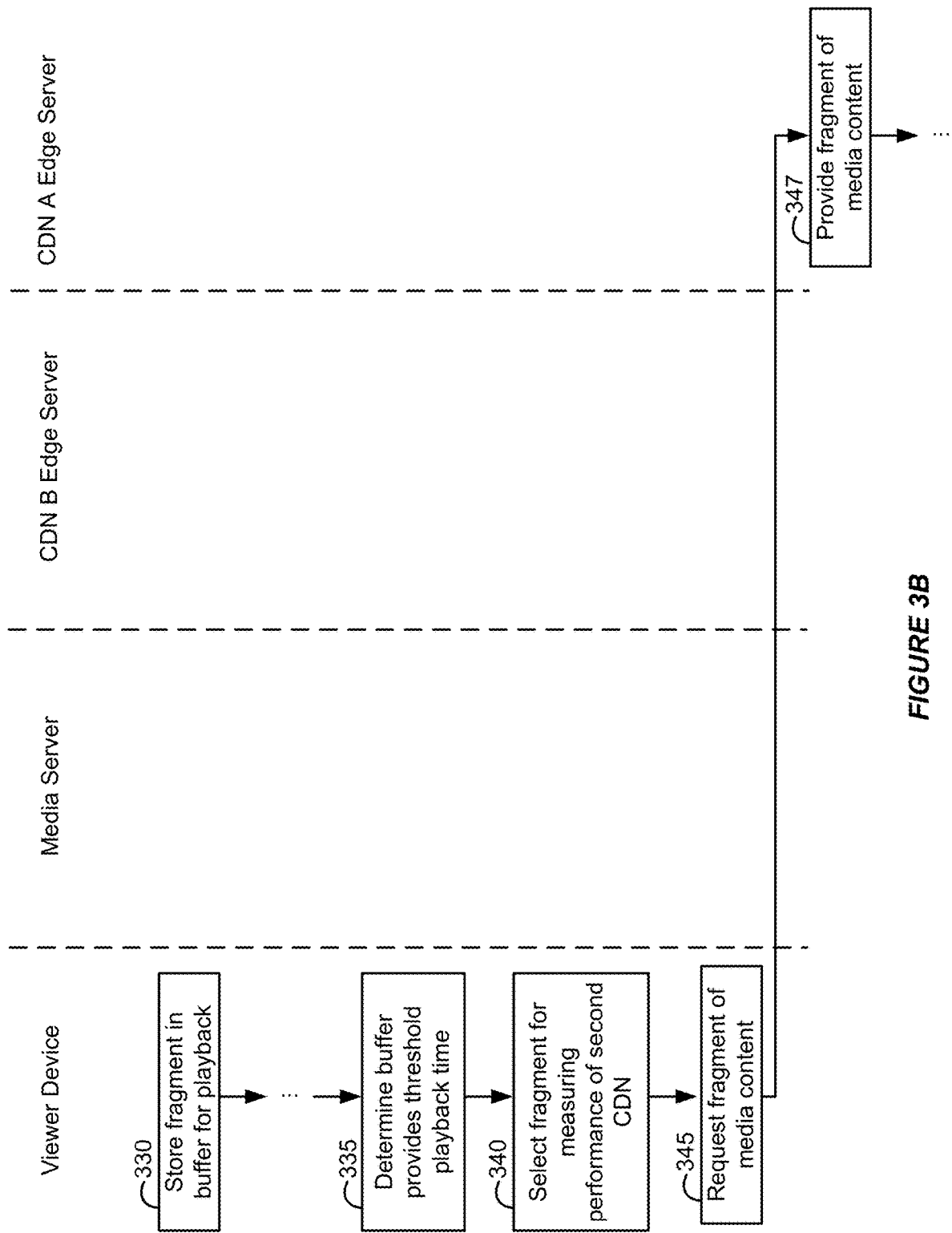

In FIG. 3B, multiple fragments can be stored in playback buffer 115. Eventually, playback buffer 115 reaches playback buffer threshold level 135 providing a certain threshold playback time (335). Playback buffer threshold level 135 represents a state of playback buffer 115 in which the fragments currently stored in playback buffer 115 provide enough safety margin to provide a measurement of one or more other CDNs while avoiding a rebuffering event if the request from another CDN times out (and therefore interrupting or slowing the rate of new fragments being stored in playback buffer 115). Playback buffer threshold level 135 can correspond to a time period (e.g., playback buffer 115 includes enough fragments to provide 30 seconds of playback), a number of fragments (e.g., 20 fragments), an available capacity of playback buffer 115 (e.g., 50% of its available capacity has been filled), or other metrics.

Since playback buffer 115 has reached playback buffer threshold level 135, viewer device 105 can use manifest file 110 to select a new fragment as a test fragment to be requested from another CDN, such as from edge server 125a of CDN 130a (340). That is, while CDN 130b was initially selected as the CDN to stream from when manifest file 110 was provided by media server 120, CDN 130a can be tested to see if it can provide a better playback experience. CDN 130a can be indicated as another CDN available to stream from in manifest file 110. For example, while the new fragment can be used for playback of the media content, it can also be used to determine whether the performance of CDN 130a is better than the performance of CDN 130b, and therefore, indicate that mid-stream switching between CDNs should be performed. As a result, viewer device 105 can request the fragment for streaming the media content as well as to perform a measurement (as a measurement fragment) of the performance of CDN 130a (347).

In some implementations, rather than determining that the playback buffer provides a certain amount of playback time, viewer device 105 might request the test fragment when it determines that the current playback from edge server 125b of CDN 130b is providing a deteriorating playback experience, for example, when errors such as rebuffering are occurring, fragment requests are timing out, etc. In some implementations, the request for the test fragment might be made when edge server 125b is performing relatively well. For example, a request might be time-based (e.g., every 2 minutes during playback of the media content), at the beginning, end or middle of different scenes of the media content, a fragment may be indicated in manifest file 110 to be used as a test fragment, etc.

When the request for the measurement fragment is provided by viewer device 105, a time out period can be used to determine whether the request has failed, indicating that CDN 130a is not a better performing CDN than CDN 130b that was previously being used to stream from by viewer device 105.

For example, when requesting fragments from edge servers of CDNs, viewer device 105 can use a time out period indicating a maximum duration of a time period in which the request for a fragment has been transmitted from viewer device 105 and lasting until the requested fragment has been provided by the CDN and received at viewer device 105. If the fragment is not received by viewer device 105 within the time out period, then this is determined to be a failure indicating that the fragment has not been received, and therefore, the filling of playback buffer 115 has been halted. Viewer device 105 might then do another request for that same fragment to the same edge server of that CDN.

Figure 3C:
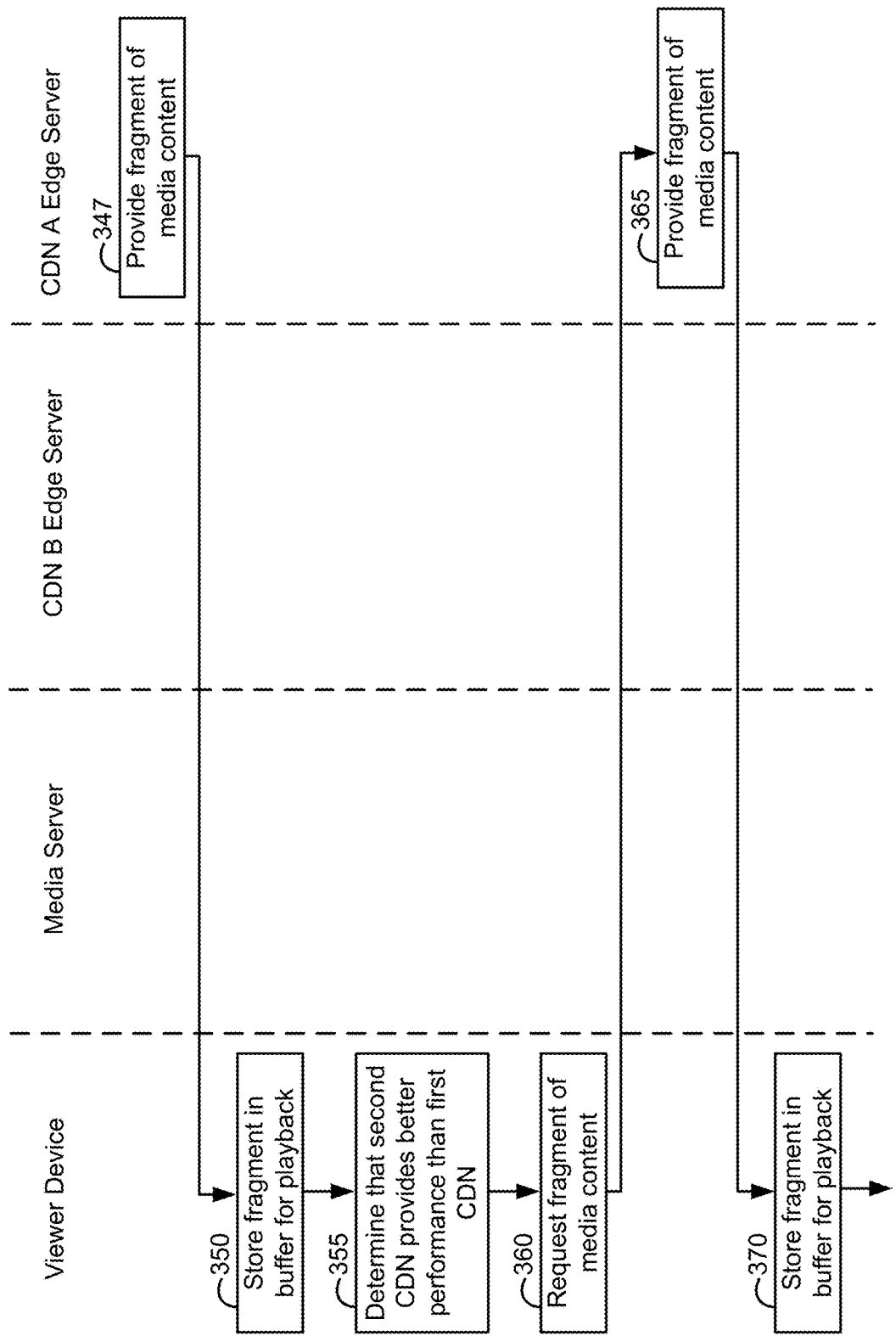

FIG. 3C shows a flowchart illustrating mid-stream CDN switching for media content playback. In FIG. 3C, the time out period for requesting a fragment from edge server 125b of CDN 130b can be used to measure the performance of edge server 125a of CDN 130a. For example, if viewer device 105 requests a measurement fragment from edge server 125a of CDN 130a and it does not provide it within the time out period, then it can be determined that edge server 125a of CDN 130a is performing worse than edge server 125b of CDN 130b because it was not able to provide a fragment within the time out period. If the measurement fragment is received within the time out period, then its receipt can be used to measure the performance of CDN 130a. For example, test data such as the throughput or data rate of the communication connection between viewer device 105 and CDN 130a when receiving the measurement fragment can be determined. If the throughput is better (e.g., a higher bits per second data rate) than the fragments previously requested from CDN 130b, then CDN 130a can be determined to be the better performing CDN that can be switched to mid-stream. In some implementations, the CDN can be switched mid-stream if the performance of CDN 130a is some threshold percentage or performance better than the performance of CDN 130b.

In some implementations, the time out period used for CDN 130b can be different from the timeout period used for CDN 130a. For example, the time out period for the CDN being measured (e.g., CDN 130a) can have a shorter in duration time out period than the CDN previously being used for streaming of the media content (e.g., CDN 130a). This allows for a switch from CDN 130b to CDN 130a only if CDN 130a has a better performance. If the performance of CDN 130a is worse, the same as, or even only slightly better, then the mid-stream switching of the playback of the media content can be prevented by having a lower in duration time out period for the CDN that is being measured by requesting fragment E as a measurement fragment.

In some implementations, the measurement fragment requested from the CDN whose performance is to be measured can be at a lower quality level than the fragments requested from the prior CDN. This can allow for using a shorter time out period, and therefore, reduce the disruption to the streaming of the media content if the measurement fragment request times out.

In FIG. 3C, the edge server of the CDN being measured (e.g., edge server 125a of CDN 130a) provides the requested measurement fragment to viewer device 105 (347). Viewer device 105 can then receive and store the measurement fragment in playback buffer 115 (350). Viewer device 105 can also determine and/or generate test data based on the receipt of the measurement fragment. For example, the test data can indicate the throughput of the communication connection when the measurement fragment was received.

In FIG. 3C, it is determined that the CDN providing the measurement fragment provides better performance than the prior CDN being used to provide fragments before the measurement fragment was requested (355), for example, because the measurement fragment was received within the time out period and its throughput is higher than the throughput associated with the prior CDN. As a result, viewer device 105 can then switch to streaming from the new CDN by requesting additional fragments from it rather than the CDN used before the measurement fragment was requested (360). The new CDN can then provide new fragments (365) and these can be stored in playback buffer 115 of viewer device 105 for playback (370). If the performance of the CDN providing the measurement fragment is not better, then viewer device 105 would resume streaming from the prior CDN.

Figure 4A:
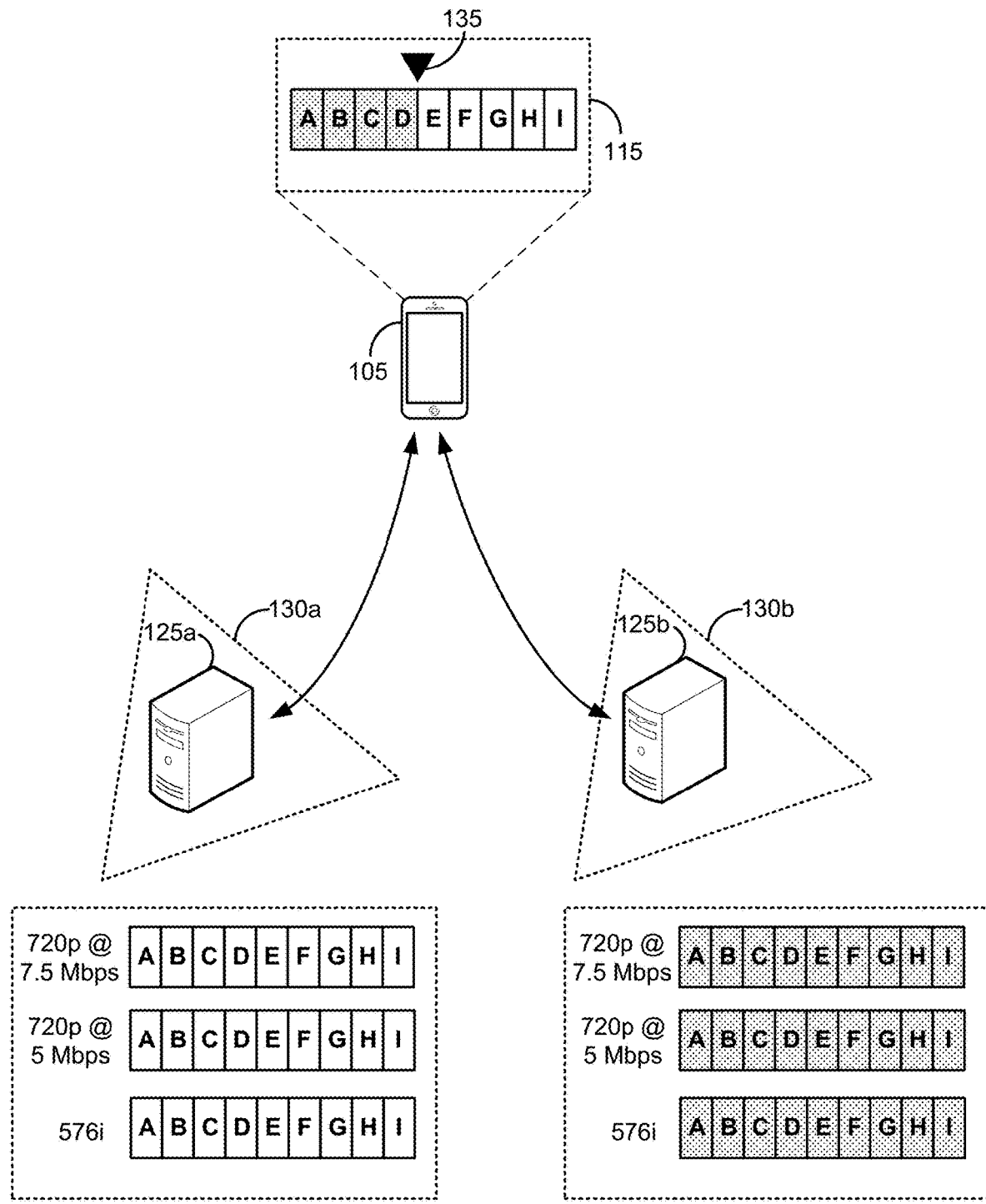
FIGS. 4A-C illustrate states of a playback buffer in accordance with mid-stream CDN switching for media content playback.

As another example, FIG. 4A illustrates a state of a playback buffer in accordance with mid-stream CDN switching for media content playback. In FIG. 4A, viewer device was streaming from edge server 125b of CDN 130b, and therefore, fragments A-D are stored in playback buffer 115. When fragment D was stored, playback buffer 115 reached playback buffer threshold level 135, and therefore, measurement fragment E was requested from edge server 125a of CDN 130a. If fragment E was received within the time out period for CDN 130a and if fragment E was received with a higher data rate than the highest data rate for fragments A-D, it can be stored in playback buffer 115 and fragments F-I requested from edge server 125a of CDN 130a rather than edge server 125b of CDN 130b, resulting in the fragments in playback buffer 115 being received from two different CDNs.

Figure 3D:
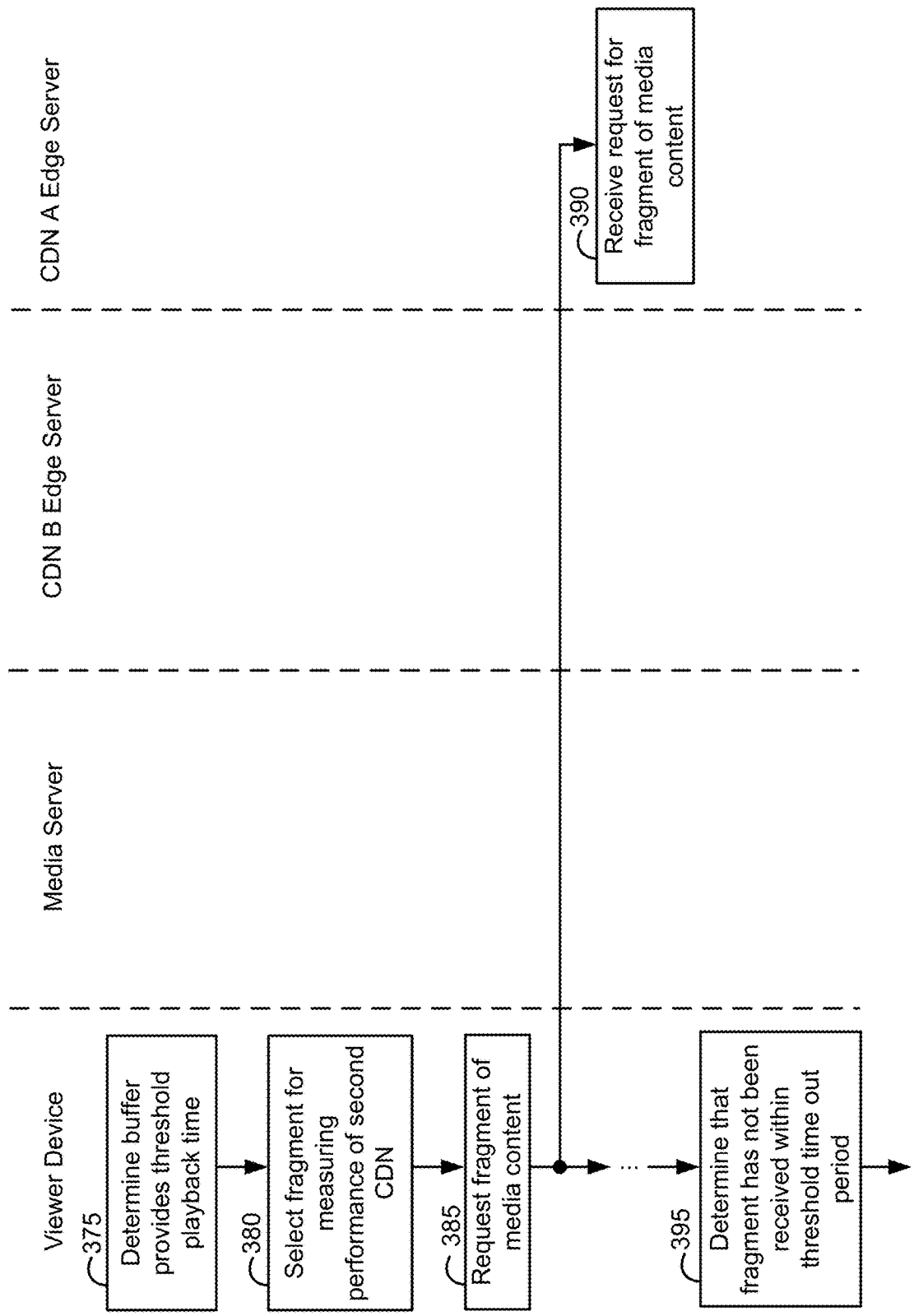

By contrast, FIG. 3D shows a flowchart illustrating a time out failure that results with the viewer device remaining with the original CDN. In FIG. 3D, playback buffer 115 can be determined to provide a threshold playback time (375), and therefore, a measurement fragment (e.g., the next fragment that should be requested for playback following the fragments already stored in playback buffer 115 or requested from CDN 130b) can be selected (380) to be requested from edge server 125a of CDN 130a (385).

Figure 3E:
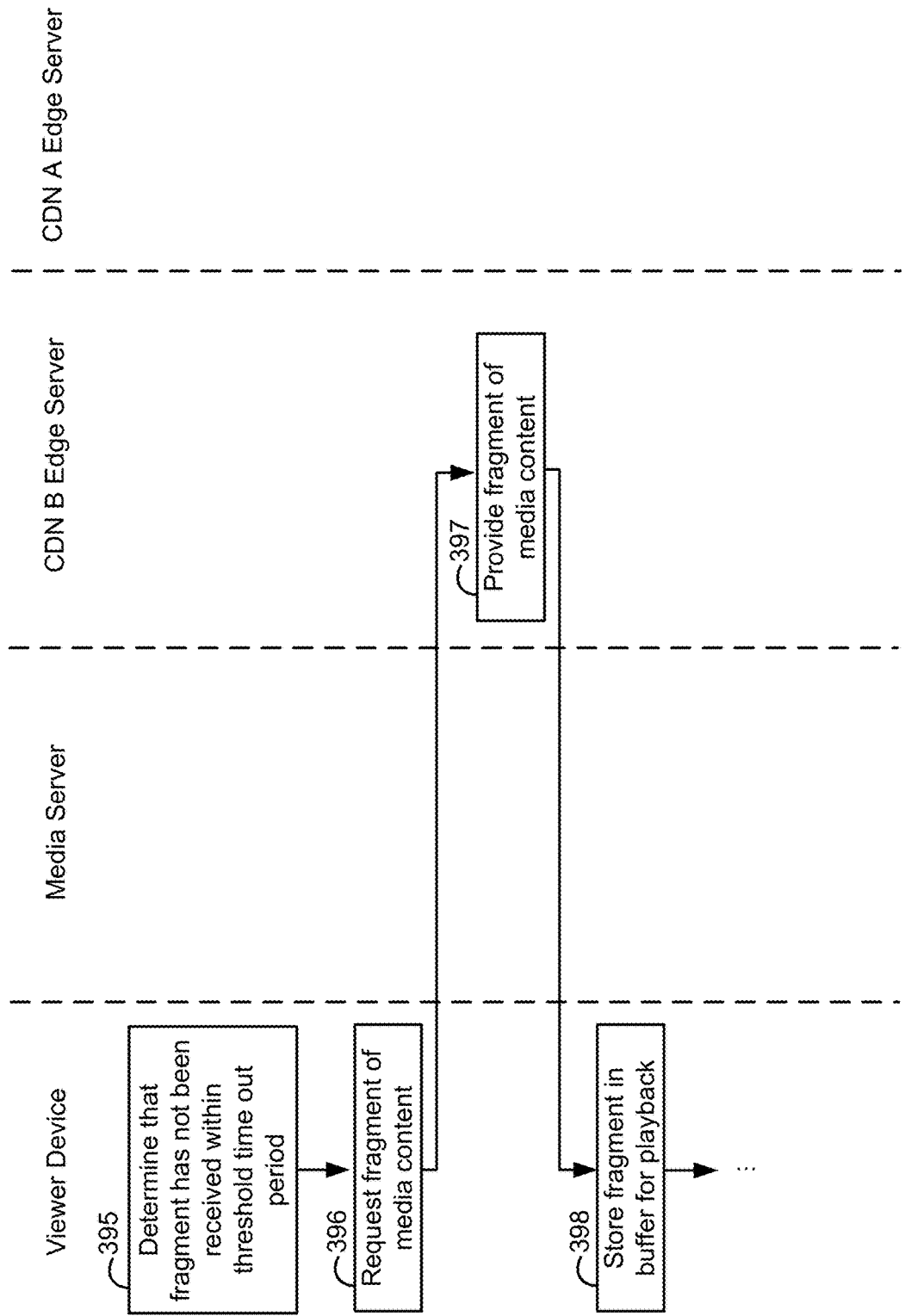

The request might be received by edge server 125a of CDN 130a (390). Concurrently or later, viewer device 105 might determine that the measurement fragment has not been received from edge server 125a of CDN 130a within the time out period (395). In other implementations, the measurement fragment might be received within the time out period, but not at a higher data rate than fragments A-D. In FIG. 3E, this would result in viewer device 105 determining that the performance of CDN 130a is worse than the performance of CDN 130b, and therefore, it can request the same measurement fragment from edge server 125b of CDN 130b (i.e., the CDN from which it was streaming before requesting the measurement fragment from the other CDN) as it continues to stream from CDN 130b rather than switching mid-stream to CDN 130a (396). This results in CDN 130b providing the same fragment that was requested from CDN 130a as the measurement fragment (397) and it can be received and stored in playback buffer 115 for playback (398).

Figure 4B:
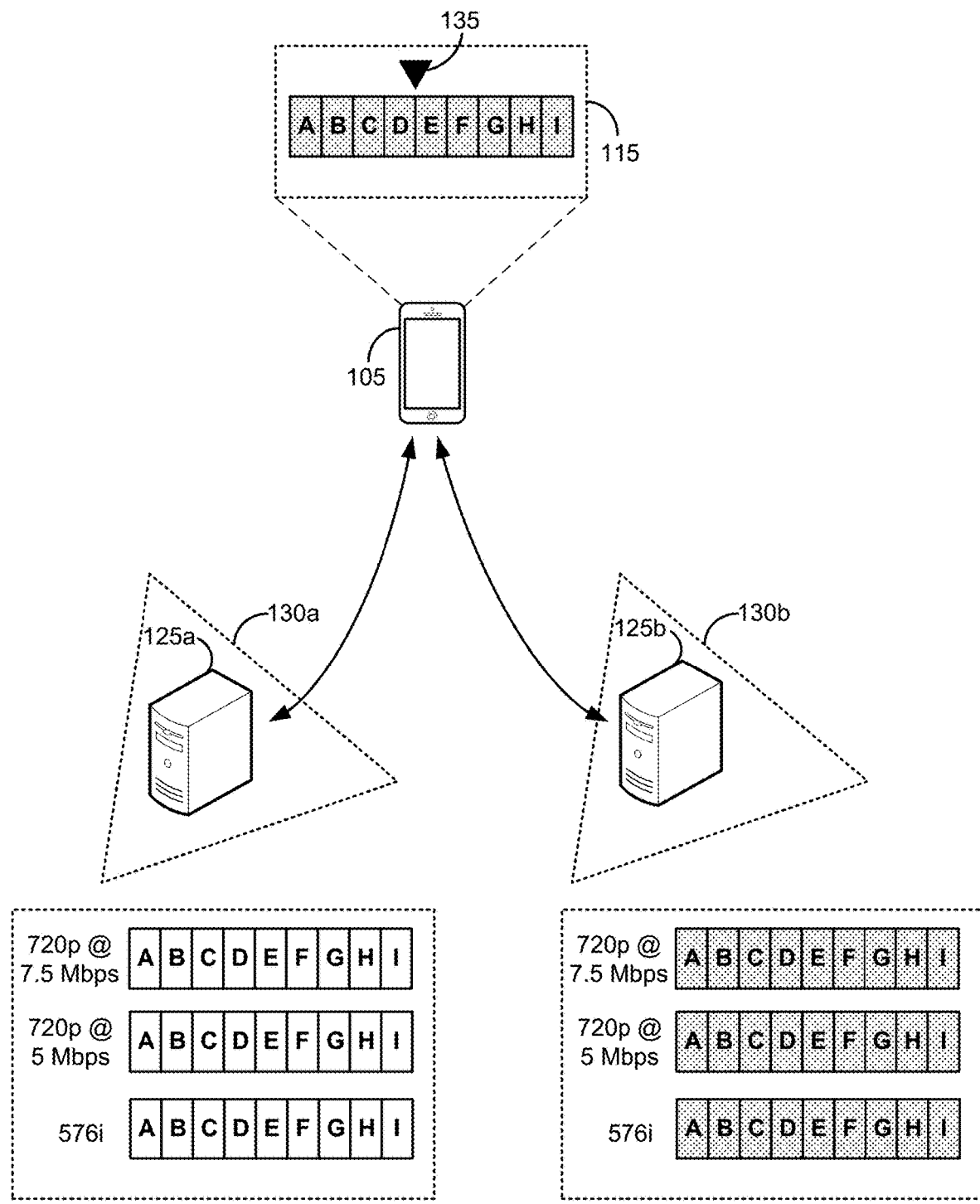

As another example, FIG. 4B illustrates a state of a playback buffer in accordance with mid-stream CDN switching for media content playback. In FIG. 4B, fragments A-I stored in playback buffer 115 are all from edge server 125b of CDN 130b. Fragment E might have been used as the measurement fragment to measure the performance of CDN 130a, but since it was not received within the time out period, it was requested from edge server 125b of CDN 130b since it was deemed to provide better performance. Fragments F-I are also from CDN 130b as mid-stream switching between the CDNs was not performed due to the time out for the measurement fragment.

Figure 4C:
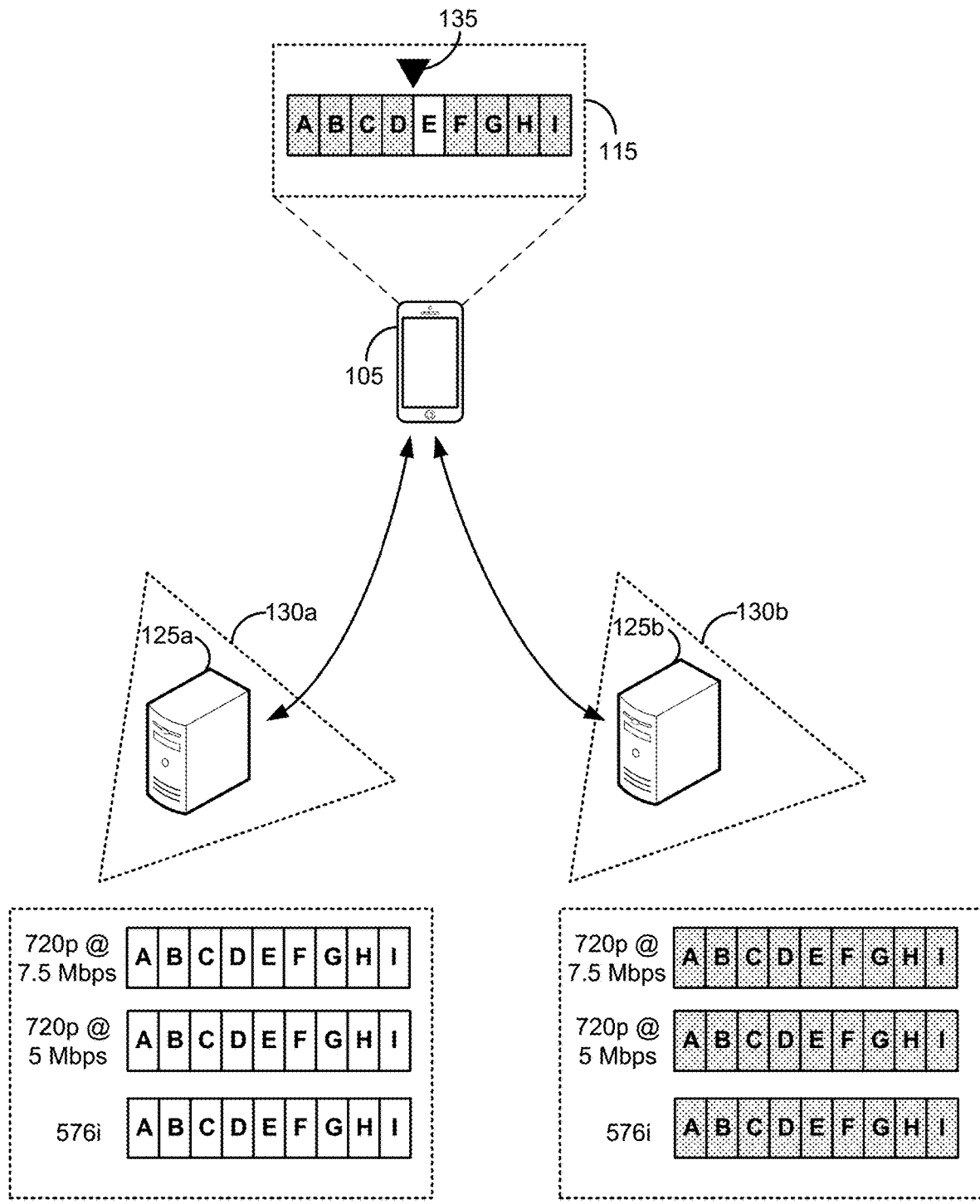

In some implementations, the measurement fragment can be stored in playback buffer 115, but playback may not switch between the CDNs. In FIG. 4C, measurement fragment E may have been received from CDN 130a following the time out period but before it was provided by CDN 130b following viewer device 105 deciding to resume streaming from CDN 130b. For example, two requests for fragment E may be pending, one from each of CDN 130a and 130b. The first fragment E to be received can be stored in playback buffer 115. As another example, based on the receipt of fragment E, CDN 130a is determined to not be performing better than CDN 130b, and therefore, streaming (e.g., requesting fragments F-I) can resume from CDN 130b.

In some implementations, the same fragment can be requested from multiple CDNs. For example, fragment E can be requested from both CDN 130b and 130a. The data rate at which the fragments are received can then be compared and the streaming can then switch to the other CDN or stay with the CDN providing the better performance.

In some implementations, the measurement fragment can be selected from the fragments detailed in manifest file 110 based on the sizes of the fragments. For example, viewer device 105 might select a fragment to be a measurement fragment based on its size (e.g., in megabytes). Viewer device 105 might select a relatively large sized fragment to ensure that the throughput of the communication connection can be properly determined. For example, if a small fragment was selected as the measurement fragment, then the full capability of the communication connection between viewer device 105 and a CDN cannot be determined. In some implementations, multiple fragments can be requested. Additionally, the measurement fragment can be selected such that when received it can be stored in playback buffer 115 so that it can also be used for playback. This would involve requesting the measurement fragment based on it occurring during playback after the fragments requested from the first CDN. Moreover, the measurement fragment would need to be stored in playback buffer 115 when received. As a result, it cannot be a fragment that occurs too far in the future of the playback of the media content because playback buffer 115 stores fragments at a much shorter period of time than the duration of the entire playback of the media content. Thus, the measurement fragment should also be requested such that it is within a time period of playback that is not too far in the future, for example, by being able to be stored in playback buffer 115 (e.g., stored in the remaining, empty portion of playback buffer 115, or within its available capacity) when received.

Figure 5:
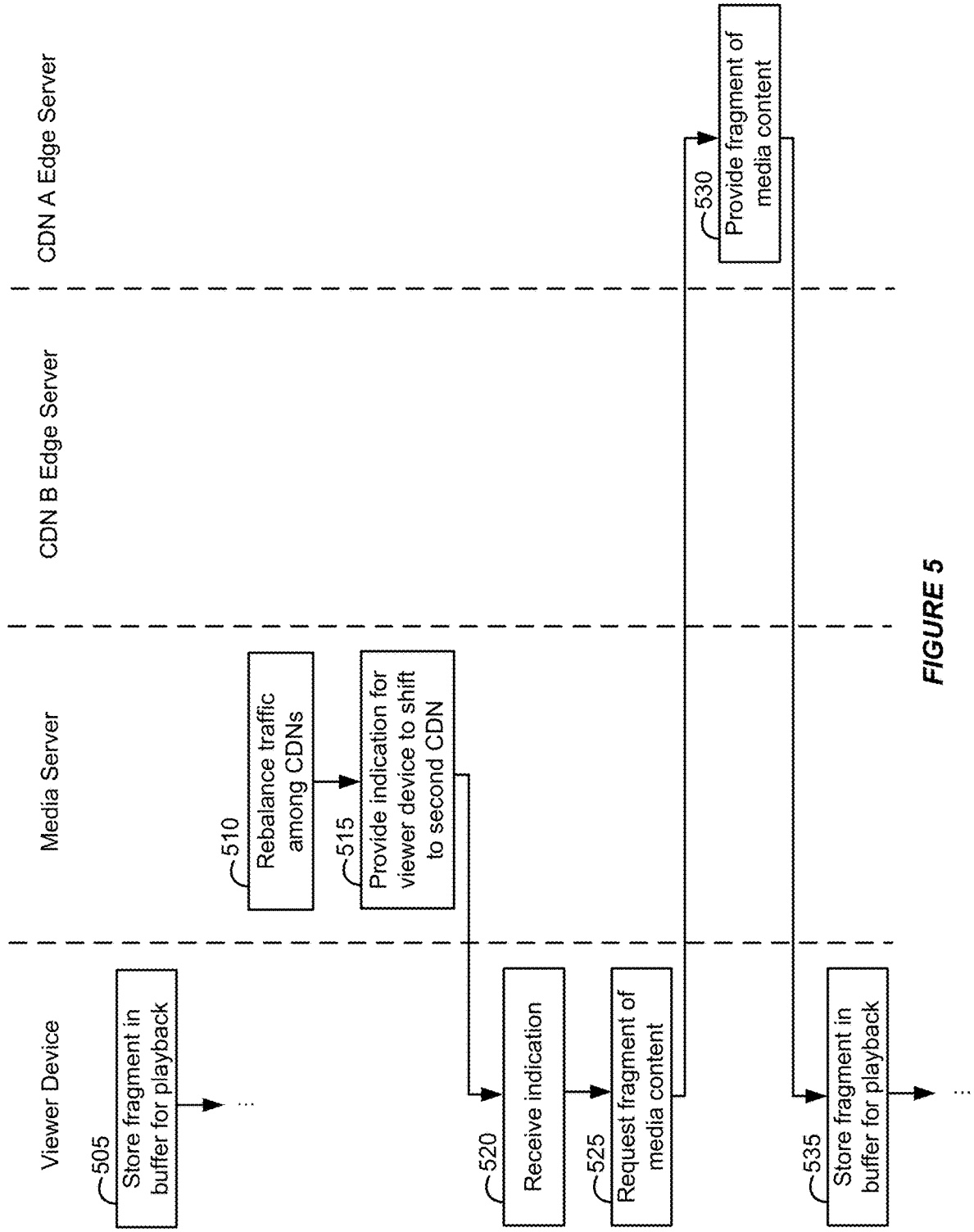
FIG. 5 is a flowchart illustrating another example of mid-stream CDN switching for media content playback.

Media server 120 can also provide data to viewer device 105 that can be used to determine whether to switch to another CDN during mid-stream of media content. FIG. 5 is a flowchart illustrating another example of mid-stream CDN switching for media content playback.

Figure 6:
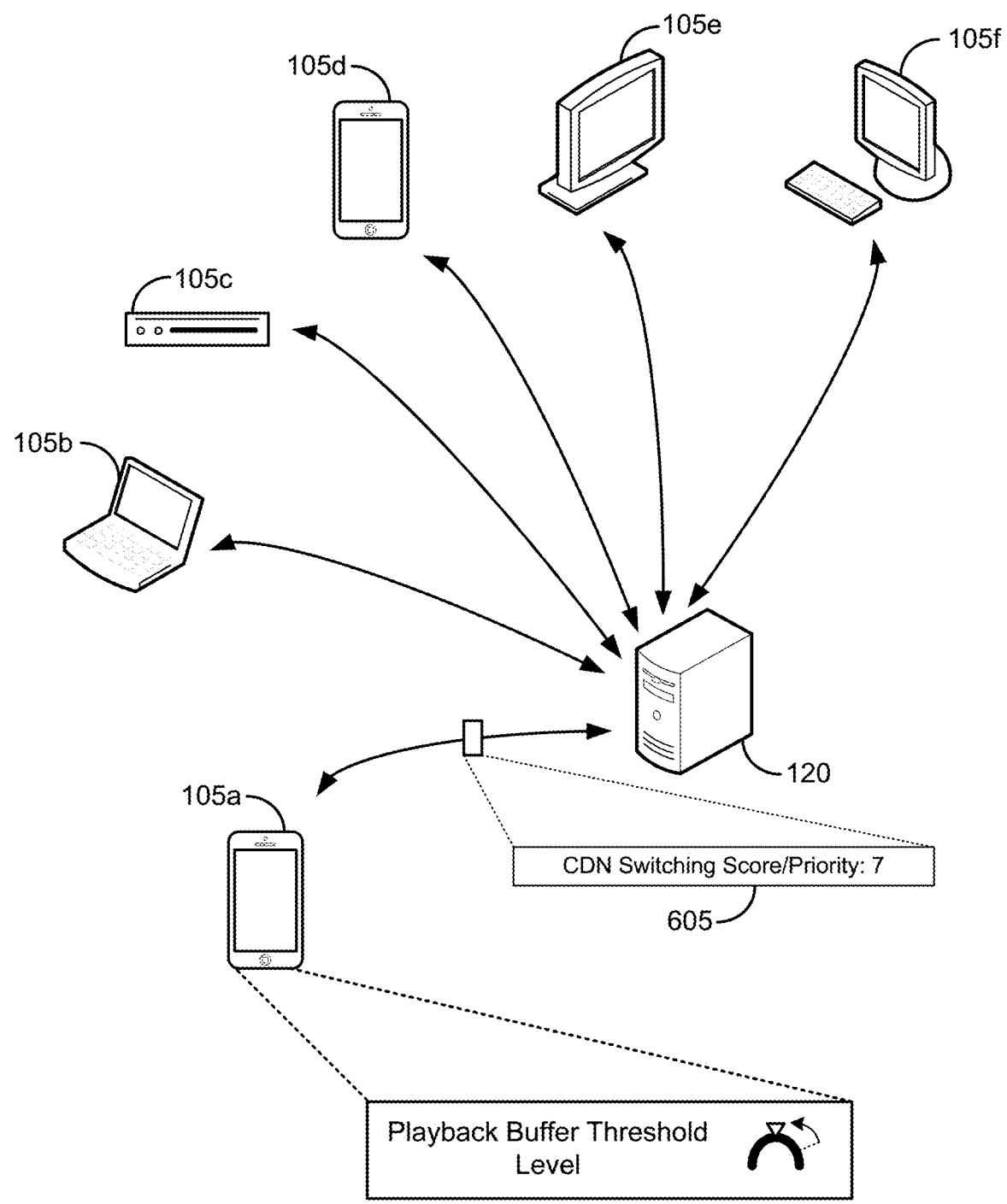
FIG. 6 illustrates an example of a media server providing data used for mid-stream CDN switching.

In some implementations, media server 120 can inform viewer device 105 with additional data that can be used to determine whether to switch CDNs mid-stream. FIG. 5 is a flowchart illustrating another example of mid-stream CDN switching for media content playback. FIG. 6 illustrates an example of a media server providing data used for mid-stream CDN switching.

In FIG. 5, viewer device 105 can store fragments from a first CDN (505). In the meantime, media server 120 can rebalance traffic among the CDNs by deciding to shift some traffic from the first CDN to a second CDN (510). For example, media server 120 might determine that some viewer devices 105b-f in FIG. 6 are in the same geographic vicinity (e.g., within a threshold distance) or with similar attributes of the viewer device (e.g., using the same Internet service provider (ISP), same device type, same device capabilities, etc.) and are streaming from the second CDN. Viewer device 105 might want to stream from that second CDN since it might provide a better performing playback of the media content. As a result, media server 120 can provide an indication to viewer device 105 that it should consider shifting to the second CDN (515). Viewer device 105 can receive the indication (520) and then request a fragment of the media content from the second CDN (525). In some implementations, the request can be for a measurement fragment which can be used to determine whether to switch mid-stream to the second CDN, or it may be a request in accordance with mid-stream switching to the second CDN (i.e., without determining whether the second CDN is a better performing CDN). The second CDN can then provide the fragments (530) and they can be stored in playback buffer 115 for playback (535).

In some implementations, in FIG. 6, media server 120 provides CDN switching data 605 to viewer device 105a as the indication to consider switching to a different CDN, as discussed above. CDN switching data 605 can be used to determine when to request a measurement fragment. For example, in FIG. 6, CDN switching data 605 provides a score, or a priority, to viewer device 105a as an indicator as to the importance for or when viewer device 105a should request a measurement fragment. The score can be generated by media server 120 based on the performances of CDNs or viewer devices 105a-f, characteristics of viewer devices of 105a-f, playback history of viewer device 105a-f, or any of the other metrics disclosed herein.

The score is used to determine playback buffer threshold level 135, the time out period for measurement fragments, or other metrics disclosed herein. That is, the score can be used by viewer device 105a to determine when to request a measurement fragment from another CDN, as well as the threshold used to determine whether another CDN is a better performing CDN, as previously discussed. For example, a higher score can result in adjusting playback buffer threshold level 135 to a lower level, or vice versa. In other implementations, a higher score can result in adjusting playback buffer threshold level 135 to a higher score, and a lower score can result in adjusting playback buffer threshold level to a lower score. The time out period for a CDN to be measured can also be adjusted based on the score indicated in CDN switching data 605.

Different viewer devices can be provided different scores by media server 120. As a result, different viewer devices can behave differently as to when to request a measurement fragment. In some implementations, CDN switching data 605 can also indicate the CDN that should be measured and possibly switched to mid-stream, or provide a list of CDNs in a priority order to be measured.

For example, in some implementations, media server 120 might decide that several viewer devices should switch from streaming from one CDN to another CDN. However, this might result in a large number of viewer devices switching mid-stream to the same CDN, which can cause a large bottleneck at the second CDN. To reduce the likelihood of the second CDN being unable to handle such a sudden and large volume of mid-stream switching, the switching of the viewer devices can be prioritized by the media server using CDN switching data 605.

In some implementations, the devices might switch based on the state of their playback buffers 115 (e.g., the available capacity, or how much of playback buffer 115 is currently used to store fragments). For example, viewer devices may receive data from media server 120 indicating that they should switch streaming from CDN 130b to CDN 130a. A first group of viewer devices with states of their playback buffers 115 at or above their playback buffer threshold levels 135 might switch first. A second group of viewer devices with their playback buffers 115 below playback buffer threshold level 135 can switch some time later, or may switch when they reach playback buffer threshold level 135.

In other implementations, the first group of viewer devices to switch to the second CDN might have their playback buffers 115 beneath playback buffer threshold level 135 and then the second group of viewer devices can switch later. In some implementations, before switching, the viewer devices may request a measurement fragment, as previously described, before switching.

In some implementations, the measurements of the performances of the CDNs can also be used to re-order a priority of (or re-prioritize) CDNs for a viewer device to use. For example, the viewer device may be streaming from a first CDN and then make measurements of the performance of several other CDNs. The viewer device can then determine an order of CDNs to use to request fragments. For example, if the viewer device begins to experience time out failures from the first CDN, then it can request fragments from the next highest prioritized CDN. The prioritized list, or order, of the CDNs can be based on the measured data rate of the measurement fragments received from those CDNs. For example, the CDN which provided a measurement fragment at a highest data rate can be prioritized first, followed by a CDN which provided a measurement fragment at a second highest data rate, and so forth.

The aforementioned techniques can be used for live streaming or video on demand (VOD) streaming of media content. For example, a playback buffer being filled with fragments can be used in either VOD or live streaming. In some live streaming scenarios, viewers who are closer to the live broadcast (i.e., receiving the latest playback data faster than other viewers) might be given priority to switch to another CDN over the other viewers.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer implemented method comprising:
    requesting, by an electronic device, manifest data from a media server, the manifest data representing playback options of media content to be streamed from a first edge server of a first content delivery network (CDN);
    receiving, by the electronic device, the manifest data from the media server;
    requesting, by the electronic device, playback of a first fragment of the media content indicated in the manifest data from the first edge server of the first CDN to stream the media content;
    receiving, by the electronic device, the first fragment from the first edge server of the first CDN;
    storing, by the electronic device, the first fragment in a playback buffer to provide playback of a portion of the media content corresponding to the first fragment;

determining, by the electronic device, that a plurality of fragments of the media content stored in the playback buffer provides a threshold playback time of the media content, each fragment in the plurality of fragments being received in response to a request for playback of the fragment generated by the electronic device, the plurality of fragments including the first fragment;

requesting, by the electronic device, a second fragment of the media content indicated in the manifest data from a second edge server of a second CDN based on the determination by the electronic device that the plurality of fragments stored in the playback buffer provides the threshold playback time of the media content, the request for the second fragment specifying the second edge server and being generated using the manifest data;

receiving, by the electronic device, the second fragment from the second edge server of the second CDN;

storing, by the electronic device, the second fragment in the playback buffer to provide playback of a portion of the media content corresponding to the second fragment;

determining, by the electronic device, that the second CDN provides a better performance than the first CDN based on the receiving of the second fragment, wherein determining that the second CDN provides a better performance than the first CDN comprises determining that the first CDN provided the first fragment at a first data rate, that the second CDN provided the second fragment at a second data rate, and that the second data rate was at least a predetermined threshold amount greater than the first data rate; and requesting, by the electronic device, subsequent fragments of the media content from the second CDN thereby switching streaming of the media content from the first CDN to the second CDN based on the determination that the second CDN provides the better performance than the first CDN, each request for fragments in the subsequent fragments specifying the second edge server and being generated using the manifest data.

2. The computer implemented method of claim 1, wherein the first fragment is received within a first time out period representing a time duration in which the first fragment is to be received from the first CDN, and the second fragment is received within a second time out period representing a time duration in which the second fragment is to be received from the second CDN, the first time out period and the second time out period being different.

3. The computer implemented method of claim 2, wherein the first time out period is longer than the second time out period.

4. The computer implemented method of claim 1, wherein the second fragment of the media content has a lower quality level, including at least one of a lower bitrate and a lower resolution, than the first fragment of the media content.

5. The computer implemented method of claim 1, wherein determining,
by the electronic device, that the second CDN provides the better performance than the first CDN based on the receiving of the second fragment comprises determining that the electronic device can stream the media content at a higher quality level, including at least one of a higher bitrate and a higher resolution, while maintaining continuous playback of the media content by receiving the media content from the second CDN rather than the first CDN.

6. A system comprising:
a viewer device including one or more processors and memory configured to:
request manifest data representing playback options of media content;
request for playback a plurality of fragments of the media content from a first edge server of a first content delivery network (CDN), each request for a fragment of the plurality of fragments specifying the first edge server and being generated using the manifest data;
receive the plurality of fragments of the media content from the first edge server;
store the plurality of fragments in a playback buffer to provide playback of portions of the media content corresponding to the requested plurality of fragments;
determine, by the viewer device, that the plurality of fragments of the media content stored in the playback buffer provides a threshold playback time of the media content, each fragment in the plurality of fragments being received in response to a request for playback of the fragment;
request, by the viewer device, a test fragment of the media content from a second edge server of a second CDN based on the determination by the viewer device that the plurality of fragments stored in the playback buffer provides the threshold playback time of the media content, the request for the test fragment specifying the second edge server and being generated using the manifest data;
receive the test fragment from the second edge server;
determine, by the viewer device, that the second edge server performs better than the first edge server based on test data relating to receipt of the test fragment, wherein determining that the second edge server performs better than the first edge server comprises determining that the first edge server provided at least some of the plurality of fragments at a first data rate, that the second edge server provided the test fragment at a second data rate, and that the second data rate was at least a predetermined threshold amount greater than the first data rate; and
request, by the viewer device, additional fragments of the media content from the second edge server based on the determination that the second edge server performs better than the first edge server, each request for fragments in the additional fragments specifying the second edge server and being generated using the manifest data.

7. The system of claim 6, wherein the fragments from the first edge server of the first CDN are received within a first time out period representing a time duration in which the fragments are to be received from the first CDN, and the test fragment is received within a second time out period representing a time duration in which the test fragment is to be received from the second CDN, the first time out period and the second time out period being different.

8. The system of claim 7, wherein the second time out period is shorter in time than the first time out period.

9. The system of claim 6, wherein the test fragment corresponds to a portion of playback of the media content occurring after a portion of the playback corresponding to the fragments received from the first edge server of the first CDN, and the test fragment is selected based on a size of the test fragment and an available capacity of the playback buffer.

10. The system of claim 6, the one or more processors and memory further configured to:

receive, from a media server, data indicating a score representing a priority to request the test fragment, and wherein requesting the test fragment is based on the score.

11. The system of claim 6, wherein the first edge server of the first CDN and the second edge server of the second CDN have the same origin server.

12. The system of claim 6, wherein the threshold playback time is determined using an available capacity in the playback buffer or a number of fragments of the media content in the playback buffer.

13. The system of claim 6, wherein the request for the additional fragments from the second edge server occurs without deterioration in the playback of the media content provided by the first edge server.

14. The system of claim 6, wherein the test fragment of the media content has a lower quality level, including at least one of a lower bitrate and a lower resolution, than the plurality of fragments of the media content.

15. The system of claim 6, wherein the viewer device including one or more processors and memory are configured to determine, by the viewer device, that the second edge server performs better than the first edge server by determining that the viewer device can stream the media content at a higher quality level, including at least one of a higher bitrate and a higher resolution, while maintaining continuous playback of the media content by receiving the media content from the second edge server rather than the first edge server.

16. A computer program product comprising one or more non-transitory computer-readable media having computer instructions stored therein, the computer program instructions being configured such that, when executed by one or more computing devices, the computer program instructions cause the one or more computing devices to:

request manifest data representing playback options of media content;

request for playback a plurality of fragments of media content from a first edge server of a first content delivery network (CDN), each request for a fragment of the plurality of fragments specifying the first edge server and being generated using the manifest data;

receive the plurality of fragments of the media content from the first edge server;

store the plurality of fragments in a playback buffer to provide playback of portions of the media content corresponding to the requested plurality of fragments;

determine, by the one or more computing devices, that the plurality of fragments of the media content stored in the playback buffer provides a threshold playback time of the media content, each fragment in the plurality of fragments being received in response to a request for playback of the fragment;

request, by the one or more computing devices, a test fragment of the media content from a second edge server of a second CDN based on the determination by the one or more computing devices that the plurality of fragments stored in the playback buffer provides the threshold playback time of the media content, the request for the test fragment specifying the second edge server and being generated using the manifest data;

receive the test fragment from the second edge server;

determine, by the one or more computing devices, that the second edge server performs better than the first edge server based on test data relating to receipt of the test fragment, wherein determining that the second edge server performs better than the first edge server comprises determining that the first edge server provided at least some of the plurality of fragments at a first data rate, that the second edge server provided the test fragment at a second data rate, and that the second data rate was at least a predetermined threshold amount greater than the first data rate; and request, by the one or more computing devices, additional fragments of the media content from the second edge server based on the determination that the second edge server performs better than the first edge server, each request for fragments in the additional fragments specifying the second edge server and being generated using the manifest data.

17. The computer program product of claim 16, wherein the fragments from the first edge server of the first CDN are received within a first time out period representing a time duration in which the fragments are to be received from the first CDN, and the test fragment is received within a second time out period representing a time duration in which the test fragment is to be received from the second CDN, the first time out period and the second time out period being different.

18. The computer program product of claim 17, wherein the second time out period is shorter in time than the first time out period.

19. The computer program product of claim 16, wherein the test fragment corresponds to a portion of playback of the media content occurring after a portion of the playback corresponding to the fragments received from the first edge server of the first CDN, and the test fragment is selected based on a size of the test fragment and an available capacity of the playback buffer.

20. The computer program product of claim 16, the computer program instructions further to cause the one or more computing devices to:

receive, from a media server, data indicating a score representing a priority to request the test fragment, and wherein requesting the test fragment is based on the score.

21. The computer program product of claim 16, wherein the first edge server of the first CDN and the second edge server of the second CDN have the same origin server.

22. The computer program product of claim 16, wherein the threshold playback time is determined using an available capacity in the playback buffer or a number of fragments of the media content in the playback buffer.

23. The computer program product of claim 16, wherein the request for the additional fragments from the second edge server occurs without deterioration in the playback of the media content provided by the first edge server.

24. The computer program product of claim 16, wherein the test fragment of the media content has a lower quality level, including at least one of a lower bitrate and a lower resolution, than the plurality of fragments of the media content.

25. The computer program product of claim 16, the computer program instructions further to cause the one or more computing devices to:

determine, as part of determining that the second edge server performs better than the first edge server, that the one or more computing devices can stream the media content at a higher quality level, including at least one of a higher bitrate and a higher resolution, while maintaining continuous playback of the media content by receiving the media content from the second edge server rather than the first edge server.

* * * * *